United States Patent
Choi et al.

(10) Patent No.: US 11,662,452 B2
(45) Date of Patent: May 30, 2023

(54) METHOD AND APPARATUS WITH MEASURING OF THREE-DIMENSIONAL POSITION USING RADAR SENSOR

(71) Applicant: SAMSUNG ELECTRONICS CO., LTD., Suwon-si (KR)

(72) Inventors: Sungdo Choi, Suwon-si (KR); Byung Kwan Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 272 days.

(21) Appl. No.: 16/853,042

(22) Filed: Apr. 20, 2020

(65) Prior Publication Data

US 2021/0149037 A1 May 20, 2021

(30) Foreign Application Priority Data

Nov. 19, 2019 (KR) .................. 10-2019-0148329

(51) Int. Cl.
*G01S 13/42* (2006.01)
*G01S 7/35* (2006.01)
*G01S 13/931* (2020.01)

(52) U.S. Cl.
CPC ............ *G01S 13/426* (2013.01); *G01S 7/352* (2013.01); *G01S 13/931* (2013.01)

(58) Field of Classification Search
CPC ...... G01S 13/34; G01S 13/343; G01S 13/931; G01S 13/426; G01S 7/352
See application file for complete search history.

(56) References Cited

U.S. PATENT DOCUMENTS

| 7,986,397 B1 | 7/2011 | Tiemann et al. |
| 8,077,076 B2 | 12/2011 | Walter et al. |
| 2018/0267140 A1 | 9/2018 | Corcos et al. |
| 2019/0120931 A1 | 4/2019 | Mihajlovic et al. |
| 2019/0137602 A1* | 5/2019 | Longman ................ G01S 7/352 |

FOREIGN PATENT DOCUMENTS

| JP | 2007-192575 A | 8/2007 |
| JP | 2015-59748 A | 3/2015 |
| KR | 10-2014-0103236 A | 8/2014 |

(Continued)

OTHER PUBLICATIONS

Laribi, Amir et al., "A new height-estimation method using FMCW radar Doppler beam sharpening", *2017 25th European Signal Processing Conference (EUSIPCO)*, 2017 (pp. 1982-1986).

(Continued)

*Primary Examiner* — Peter M Bythrow
(74) *Attorney, Agent, or Firm* — NSIP Law

(57) ABSTRACT

A method with three-dimensional (3D) position measuring using a radio detection and ranging (radar) sensor includes: transmitting, through the radar sensor, a transmission signal of which a carrier frequency varies over time; obtaining, through the radar sensor, a reflected signal from the transmission signal being reflected by an object; obtaining a beat frequency signal indicating a frequency difference between the transmission signal and the reflected signal; and estimating 3D position information of the object based on groups of sample data of different frequency bands extracted from the beat frequency signal.

18 Claims, 7 Drawing Sheets

(56) References Cited

FOREIGN PATENT DOCUMENTS

| KR | 10-2017-0135727 A | 12/2017 |
| KR | 10-1850941 B1 | 4/2018 |
| KR | 10-2018-0115935 A | 10/2018 |
| WO | WO 2007/032234 A1 | 3/2007 |
| WO | WO 2019/049680 A1 | 3/2019 |
| WO | WO 2019/065440 A1 | 4/2019 |

OTHER PUBLICATIONS

Nam, HyungSoo et al., "3D-Subspace-Based Auto-Paired Azimuth Angle, Elevation Angle, and Range Estimation for 24G FMCW Radar with an L-Shaped Array", *Sensors*, vol. 18, 2018 (pp. 1-20).

Orth, Alexander, Patrick Kwiatkowski, and Nils Pohl. "A novel approach for a mimo fmcw radar system with frequency steered antennas for 3d target localization." *2019 16th European Radar Conference (EuRAD)*. IEEE, 2019 (4 pages in English).

Extended European search Report dated Nov. 27, 2020 in counterpart EP Application No. 20191983.4 (14 pages in English).

\* cited by examiner

METHOD AND APPARATUS WITH MEASURING OF THREE-DIMENSIONAL POSITION USING RADAR SENSOR

CROSS-REFERENCE TO RELATED APPLICATIONS

This application claims the benefit under 35 U.S.C. § 119(a) of Korean Patent Application No. 10-2019-0148329 filed on Nov. 19, 2019, in the Korean Intellectual Property Office, the entire disclosure of which is incorporated herein by reference for all purposes.

BACKGROUND

1. Field

The following description relates to three-dimensional (3D) position measurement using a radio detection and ranging (radar) sensor.

2. Description of Related Art

Recently released vehicles are commonly equipped with an active safety system to protect drivers and reduce the risk of accidents. The active safety system may require sensors configured to recognize an external environment. A radio detection and ranging (radar) sensor is widely used among such sensors. is the radar sensor may be used because the radar sensor may be more robust against effects of weather or other external environmental conditions, in comparison to other sensors configured to recognize an external environment.

A signal of a frequency-modulated continuous-wave (FMCW) is frequently used for the radar sensor, because such a signal is easily produced and has relatively high performance in detecting vehicle information. A radar sensor using such an FMCW signal may transmit a chirp signal of which a frequency is linearly modulated, and a corresponding radar system may analyze a signal reflected from a target and estimate a distance to the target and a velocity of the target.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method with three-dimensional (3D) position measuring using a radio detection and ranging (radar) sensor includes: transmitting, through the radar sensor, a transmission signal of which a carrier frequency varies over time; obtaining, through the radar sensor, a reflected signal from the transmission signal being reflected by an object; obtaining a beat frequency signal indicating a frequency difference between the transmission signal and the reflected signal; and estimating 3D position information of the object based on groups of sample data of different frequency bands extracted from the beat frequency signal.

The estimating of the 3D position information of the object may include: extracting a plurality of groups of sample data from the beat frequency signal corresponding to a chirp signal, the plurality of groups of sample data including the groups of sample data of the different frequency bands; and estimating a distance and an elevation angle with respect to a position of the object based on the groups of sample data of the different frequency bands.

The estimating of the distance and the elevation angle may include: estimating the distance and the elevation angle with respect to the position of the object by applying a time-frequency analysis method to the groups of sample data of the different frequency bands.

The estimating of the distance and the elevation angle may include: calculating the distance and the elevation angle simultaneously through the time-frequency analysis method.

The time-frequency analysis method may be a short-time Fourier transform (STFT) or a wavelet transform (WT).

The estimating of the 3D position information of the object may include: estimating an elevation angle with respect to a position of the object using a change of a center direction of the transmission signal for each frequency band among frequency bands of transmitting antennas included in the radar sensor.

The transmitting antennas may be arranged in a horizontal direction in the radar sensor.

The 3D position information may include a distance, an azimuth, and an elevation angle with respect to a position of the object.

The estimating of the 3D position information of the object may include: estimating an azimuth with respect to a position of the object based on beat frequency signals respectively corresponding to receiving antennas of the radar sensor.

The estimating of the azimuth may include estimating the azimuth through digital beamforming for estimating a direction in which the reflected signal is received based on a difference occurring among the beat frequency signals.

The carrier frequency may be modulated based on a frequency modulation model that uses linear frequency modulation.

In another general aspect, a non-transitory computer-readable storage medium stores instructions that, when executed by a processor, cause the processor to perform the method described above.

In another general aspect, an apparatus with three-dimensional (3D) position measuring includes: a radio detection and ranging (radar) sensor configured to transmit a transmission signal of which a carrier frequency varies over time, and obtain a reflected signal from the transmission signal being reflected by an object; and a processor configured to obtain a beat frequency signal indicating a frequency difference between the transmission signal and the reflected signal, and estimate 3D position information of the object based on groups of sample data of different frequency bands extracted from the beat frequency signal.

The processor may be further configured to: extract a plurality of groups of sample data from the beat frequency signal corresponding to a chirp signal, the plurality of groups of sample data including the groups of sample data of the different frequency bands; and estimate a distance and an elevation angle with respect to a position of the object based on the groups of sample data of the different frequency bands.

The processor may be further configured to: estimate the distance and the elevation angle with respect to the position of the object by applying a time-frequency analysis method to the groups of sample data of the different frequency bands.

The time-frequency analysis method may be a short-time Fourier transform (STFT) or a wavelet transform (WT).

The processor may be further configured to: estimate an elevation angle with respect to a position of the object using a change of a center direction of the transmission signal for each frequency band among frequency bands of transmitting antennas included in the radar sensor.

The processor may be further configured to: estimate an azimuth with respect to a position of the object based on beat frequency signals respectively corresponding to receiving antennas of the radar sensor.

The processor may be further configured to: estimate the azimuth through digital beamforming for estimating a direction in which the reflected signal is received based on a difference occurring among the beat frequency signals.

In another general aspect, an apparatus with three-dimensional (3D) position measuring includes a radio detection and ranging (radar) sensor and a processor. The radar sensor is configured to: transmit a transmission signal of which a carrier frequency varies over time, using a plurality of transmission antennas corresponding to respective frequency bands of the transmission signal; and obtain a reflected signal from the transmission signal being reflected by an object. The processor is configured to: obtain beat frequency signals respectively corresponding to receiving antennas of the radar sensor and indicating a frequency difference between the transmission signal and the reflected signal; and estimate 3D position information of the object based on groups of sample data of different frequency bands extracted from the beat frequency signals.

The 3D position information may include a distance and an elevation of a position of the object relative to a position of the apparatus.

The processor may be further configured to estimate the 3D position information by estimating an elevation angle with respect to a position of the object based on a change of a center direction of the transmission signal for each of the respective frequency bands of the transmission signal.

The processor may be further configured to estimate the 3D position information by estimating a distance and an elevation angle with respect to a position of the object by applying a time-frequency analysis method to the groups of sample data of the different frequency bands.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1A:
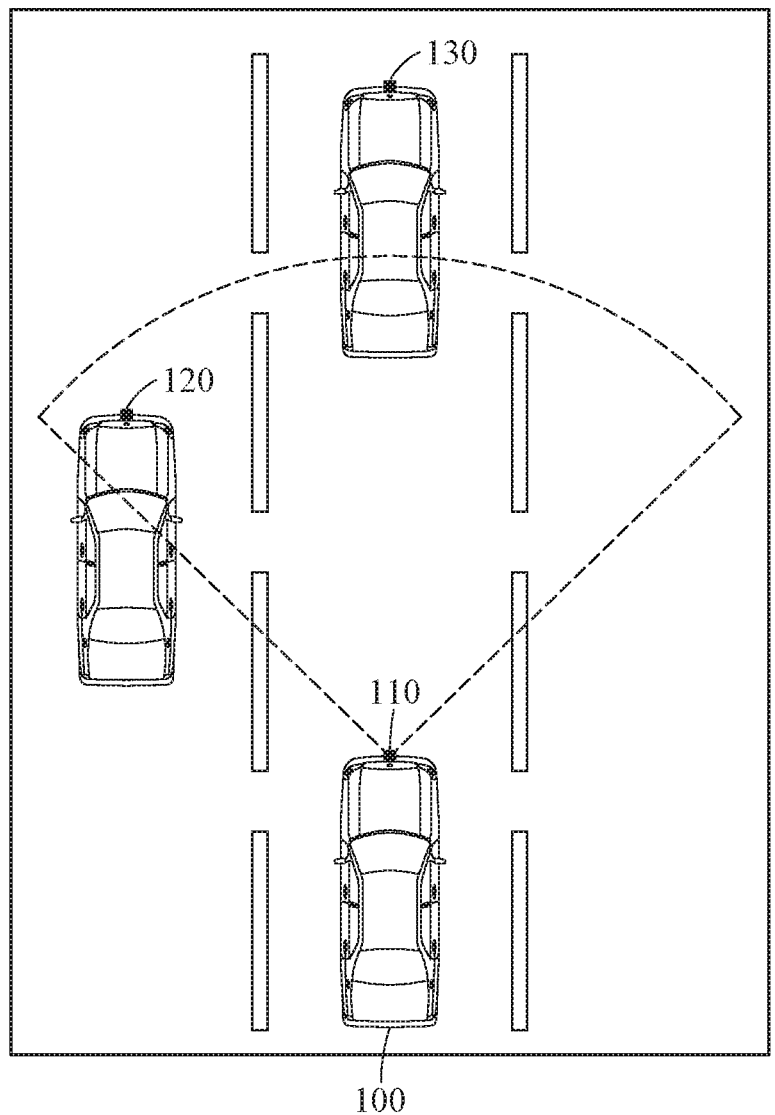
FIGS. 1a and 1b are diagrams illustrating an example of measuring a three-dimensional (3D) position using a radio detection and ranging (radar) sensor.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 1B:
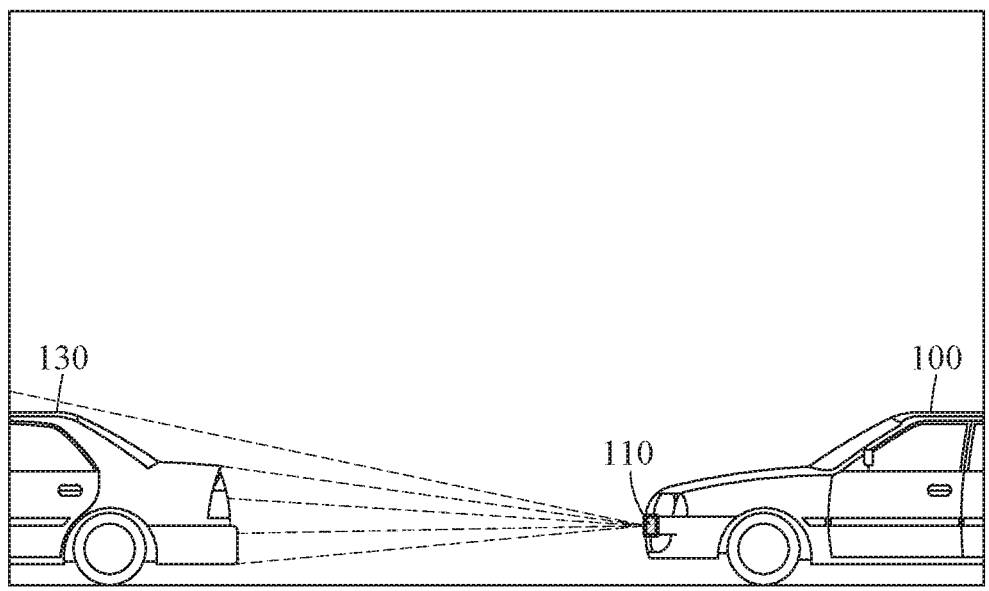

FIGS. 1a and 1b are diagrams illustrating an example of measuring a three-dimensional (3D) position using a radio detection and ranging (radar) sensor.

Referring to FIG. 1a, an apparatus 100 for measuring a 3D position (hereinafter "3D position measuring apparatus"), may measure, using a radar sensor 110, a 3D position of one or more objects, for example, an object 120 and an object 130, that are present adjacent to the 3D position measuring apparatus 100. According to an example, the 3D position measuring apparatus 100 may be applied to an advanced driver assistance system (ADAS) that provides a driver safety and convenience through various sensors located inside or outside a vehicle, a recognition system for facial recognition or gesture recognition, a surveillance/security system, and the like. Hereinafter, an example of estimating a 3D position of an object present around the 3D position measuring apparatus 100 by the 3D position measuring apparatus 100, wherein the 3D position measuring apparatus 100 is disposed in a vehicle, will be mainly described. However, the scope of this disclosure is not limited to the example described herein. The 3D position measuring apparatus 100 may also be used for various other applications that utilize 3D position information of an object.

The radar sensor 110 may be disposed inside or outside the 3D position measuring apparatus 100, and may radiate a transmission signal for estimating a position of an object, for example, the objects 120 and 130, through one or more transmitting antennas. In an example, the radar sensor 110 may be a frequency-modulated continuous-wave (FMCW) radar sensor that has a plurality of transmitting antennas and is configured to radiate, through the transmitting antennas, an FMCW transmission signal of which a carrier frequency varies over time. The transmission signal radiated from the radar sensor 110 may be reflected by the one or more objects, for example, the objects 120 and 130, and one or more reflected signals may be obtained from the transmission signal being reflected by the one or more objects. The reflected signal(s) may be obtained through one or more receiving antennas included in the radar sensor 110. In an example, the radar sensor 110 may have a plurality of receiving antennas.

The 3D position measuring apparatus 100 may then estimate the 3D position of the one or more objects, for example, the objects 120 and 130, by analyzing the reflected signal(s) obtained through the receiving antennas. In an example, the 3D position measuring apparatus 100 may estimate a distance from the 3D position measuring apparatus 100 to the object present nearby, and an azimuth corresponding to a position of the object in a horizontal direction or a horizontal angle. In addition, the 3D position measuring apparatus 100 may estimate an elevation angle corresponding to a position of the object 130 in a vertical direction or a vertical angle, as illustrated in FIG. 1b. As described above, the 3D position measuring apparatus 100 may estimate 3D position information including a distance, an azimuth, and an elevation angle with respect to a position of the object, for example, the objects 120 and 130. According to an example, the 3D position measuring apparatus 100 may estimate a 3D position of an object based on data obtained by other sensors, for example, an image sensor and the like, in addition to a reflected signal obtained using the radar sensor 110. The reflected signal described herein may also be referred to as a received signal.

Hereinafter, a way by which the 3D position measuring apparatus 100 measures a 3D position of an object using the radar sensor 110 will be described in greater detail.

Figure 2:
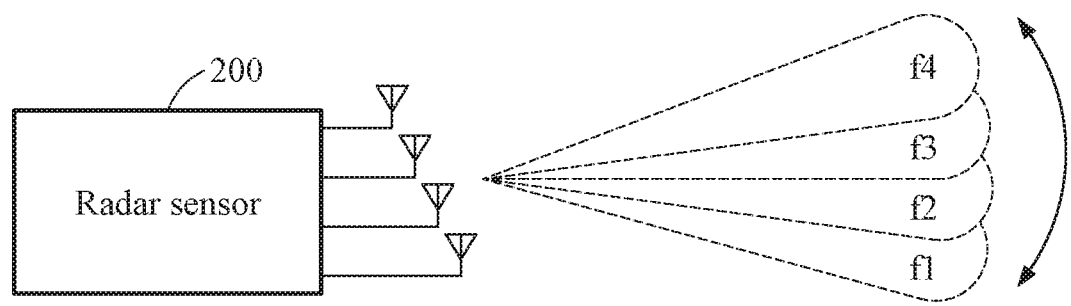
FIG. 2 is a diagram illustrating an example of a change of a center direction of a transmission signal in a vertical direction according to a frequency band.

FIG. 2 is a diagram illustrating an example of a change of a center direction of a transmission signal in a vertical direction according to a frequency band.

Referring to FIG. 2, a radar sensor 200 used by a 3D position measuring apparatus may transmit an FMCW transmission signal of which a frequency varies over time. A center direction of the transmission signal of the radar sensor 200 may vary in a vertical direction based on a frequency band. The vertical direction may correspond to a direction perpendicular to a horizontal plane. For example, as a carrier frequency of the transmission signal to be transmitted from the radar sensor 200 increases, the center direction of the transmission signal may also gradually rise in the vertical direction. This may be attributed to a transmission characteristic based on an arrangement and a structure of transmitting antennas of the radar sensor 200. In the example of FIG. 2, when a carrier frequency gradually increases from f1 to f4, a center direction of a transmission signal of the carrier frequency f1 may face toward a bottom and the center direction of the transmission signal of the carrier frequency f4 may face toward a top. The 3D position measuring apparatus may estimate an elevation angle associated with a position of an object in a vertical direction using the characteristic of the radar sensor 200 described above.

Figure 3:
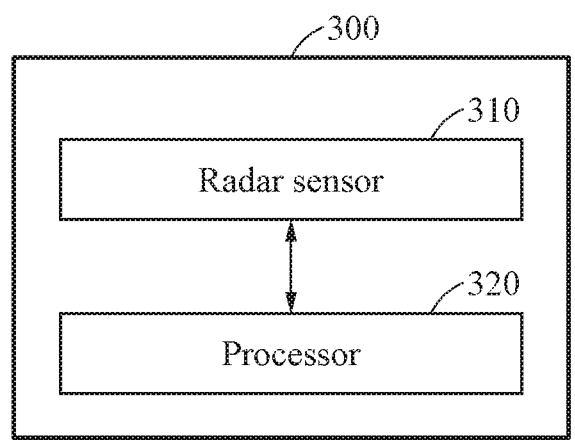
FIG. 3 is a diagram illustrating an example of a configuration of a 3D position measuring apparatus.

FIG. 3 is a diagram illustrating an example of a configuration of a 3D position measuring apparatus.

Referring to FIG. 3, a 3D position measuring apparatus 300 includes, for example, a radar sensor 310 and a processor 320.

The radar sensor 310 may sense radar data. For example, the radar sensor 310 may transmit a transmission signal of which a carrier frequency varies over time through one or more transmitting antennas, and may obtain a reflected signal from the transmission signal being reflected by an object through one or more receiving antennas. The transmission signal may be an FMCW signal that is generated based on a frequency modulation model, and the FMCW signal may be radiated externally to be transmitted outside the radar sensor 310 through the transmitting antennas. The radiated FMCW signal may be reflected from the object, and the reflected signal which is obtained from the FMCW signal being reflected by the object may be received by the receiving antennas and form the radar data. In an example, the radar sensor 310 may include the transmitting antennas respectively corresponding to a plurality of transmission channels (indicated by Tx (see FIG. 4)) and the receiving antennas respectively corresponding to a plurality of reception channels (indicated by Rx (see FIG. 4)).

The processor 320 may control operations and functions of the 3D position measuring apparatus 300. The processor 320 may set a detection area and a detection resolution of the 3D position measuring apparatus 300, and adjust a characteristic of the transmission signal based on the set detection area and the set detection resolution. For example, the processor 320 may adjust a characteristic of the carrier frequency of the transmission signal, for example, a frequency range, a slope, a frequency change time, and the like, and/or adjust a characteristic of an intensity of the transmission signal. The detection area may be set based on a detection range and a detection angle. The detection resolution may be set based on a detection unit of a position of an object, for example, 1 meter (m) and 50 centimeters (cm).

The processor 320 may estimate 3D position information and/or a velocity of the object by analyzing the radar data sensed through the radar sensor 310. The 3D position information may be information that specifies a 3D position of the object and may include, for example, a distance, an azimuth, and an elevation angle with respect to a position of the object. Hereinafter, an example of measuring the distance, the azimuth, and the elevation angle as the 3D position information will be described in greater detail. However, the 3D position information of the object may also be represented by an orthogonal coordinate system or a polar coordinate system, and there is no limit to a method of representing such information.

In an example, the processor 320 may obtain a beat frequency signal indicating a frequency difference between the transmission signal and the reflected signal based on the transmission signal and the reflected signal. The beat frequency signal may also be referred to as an intermediate frequency signal.

The processor 320 may extract groups of sample data of different frequency bands from the beat frequency signal, and estimate the 3D position information of the object based on the extracted groups of sample data. In an example, the processor 320 may extract the groups of sample data by sampling a beat frequency signal corresponding to a chirp signal at a plurality of sampling points. The chirp signal may refer to a signal of which a frequency varies over time. The processor 320 may sample the beat frequency signal at the sample points, and obtain the groups of sample data by performing analog-to-digital conversion that converts a sampled analog signal value to a corresponding digital signal.

The processor 320 may estimate the distance and the elevation angle with respect to the position of the object based on the groups of sample data of the different frequency bands that are included in the obtained groups of sample data. As described above with reference to FIG. 2, the processor 320 may estimate the elevation angle with respect to the position of the object using a characteristic of a change of a center direction of the transmission signal for each frequency band. In an example, the processor 320 may estimate the distance and the elevation angle with respect to the position of the object by applying a time-frequency analysis method to the groups of sample data of the different frequency bands. The time-frequency analysis method may be a short-time Fourier transform (STFT) or a wavelet transform (WT). According to an example, the processor 320 may determine the distance with respect to the position of the object using a high-resolution range profile (HRRP). Herein, the terms "distance" and "range" may be used interchangeably. Hereinafter, an example of estimating a distance and/or an elevation angle with respect to a position of an object based on a beat frequency signal will be described in greater detail with reference to FIGS. 4 through 7.

The processor 320 may estimate the azimuth with respect to the position of the object based on beat frequency signals respectively corresponding to the receiving antennas of the radar sensor 310. In an example, the processor 320 may estimate the azimuth with respect to the position of the object using, for example, digital beamforming (DBF), estimation of signal parameters via rotational invariance technique (ESPRIT), multiple signal classification (MU-SIC), minimum variance distortionless response (MVDR), or a Bartlett's method. For example, the processor 320 may desirably estimate an azimuth corresponding to a position of the object in a horizontal direction through DBF. An example of estimating such an azimuth will be described in more detail hereinafter.

In an example, groups of sample data of a beat frequency signal may be represented by Equation 1.

$$Y = [Y(1), Y(2), \ldots, Y(i), \ldots, Y(N-1), Y(N)] \quad \text{[Equation 1]}$$

In Equation 1, i is a time index, which is a natural number greater than or equal to 1 and less than or equal to N. N is the number of groups of sample data sampled from the beat frequency signal, which is a natural number greater than or equal to 1. Y is data obtained by converting an analog value of the beat frequency signal to a digital value. For example, when a receiving antenna array included in the radar sensor 310 includes M receiving antennas, sample data Y(i) at an ith sampling point corresponding to a time index i may be represented by Equation 2.

$$Y(i) = [s_1(i), s_2(i), \ldots, s_m(i), \ldots, s_{M-1}(i), s_M(i)]^T \quad \text{[Equation 2]}$$

In Equation 2, $s_m(i)$ is a sampled value from ith sample data by sampling an intensity of a reflected signal received by an mth receiving antenna among the M receiving antennas. M is a natural number greater than or equal to 2, and m is a natural number greater than or equal to 1 and less than or equal to M. A normalization model may then be applied to the sample data Y(i). The normalization model may be represented by Equation 3.

$$A_{pNorm} = \{A_{pNorm,1}, \ldots, A_{pNorm,i}, \ldots, A_{pNorm,N}\} \quad \text{[Equation 3]}$$

In Equation 3, $A_{pNorm,i}$ is an ith normalization matrix to be applied to a value of the ith sample data among groups of sample data. The ith normalization matrix may be represented by Equation 4.

$$A_{pNorm,i} = A_{f_0}^{-1} A_{f_i} \quad \text{[Equation 4]}$$

In Equation 4, $A_{f_i}$ is a first matrix operation that converts a time-domain value corresponding to the ith sample data to angle information using a carrier frequency corresponding to ith sample data of the frequency modulation model. $A_{f_0}^{-1}$ is an inverse matrix of $A_{f_0}$, which is a second matrix operation that inversely converts angle information to a time-domain value using a reference frequency $f_0$. The first matrix operation $A_{f_i}$ in Equation 4 may also be represented by Equations 5 and 6.

$$A_{f_i} = [\alpha_{f_i}(\theta_1), \ldots, \alpha_{f_i}(\theta_k), \ldots, \alpha_{f_i}(\theta_K)]^T \quad \text{[Equation 5]}$$

$$\alpha_{f_i}(\theta_k) = \left[1, e^{\frac{j2\pi d}{\lambda_{f_i}} \sin\theta_k}, \ldots, e^{\frac{j2\pi(M-1)d}{\lambda_{f_i}} \sin\theta_k}\right] \quad \text{[Equation 6]}$$

In Equation 5, the first matrix operation $A_{f_i}$ may be represented by a set of vectors $\alpha_{f_i}(\theta_k)$, in which K is a natural number greater than or equal to 1 and k is a natural number greater than or equal to 1 and less than or equal to K. In Equation 6, d is a distance between the receiving antennas of the antenna array included in the radar sensor 310. j is an imaginary unit. $\lambda_{f_i}$ is a wavelength corresponding to the carrier frequency of the ith sample data. $\theta_k$ is a kth angle in $A_{f_i}$, and $\alpha_{f_i}(\theta_k)$ is a vector corresponding to the angle $\theta_k$ in the carrier frequency corresponding to the ith time index of the frequency modulation model. $A_{f_i}$ may be a K×M matrix consisting of K rows and M columns.

Here, $A_{fi}Y(i)$, which indicates a result of matrix product calculation between the matrix $A_{fi}$ of Equation 5 and $Y(i)$ of Equation 2, may be a K×1 dimensional vector. In the result $A_{fi}Y(i)$ of the matrix product calculation, an element in a kth row may be a value corresponding to a probability of $Y(i)$ being the kth angle $\theta_k$ and may indicate angle information. Thus, based on a result of applying the first matrix operation $A_{fi}$ to the ith sample data $Y(i)$, azimuth angle information in the ith time index may be estimated.

According to an example, the processor 320 may change a detection area or a detection resolution based on a result of measuring a 3D position of an object as described above, and adjust a characteristic of a transmission signal based on a result of the changing. For example, when it is detected that there is no object nearby, the processor 320 may increase an intensity of the transmission signal to expand the detection area. In addition, for more precise or closer detection, the processor 320 may adjust a characteristic of a change in the carrier frequency of the transmission signal.

Figure 4:
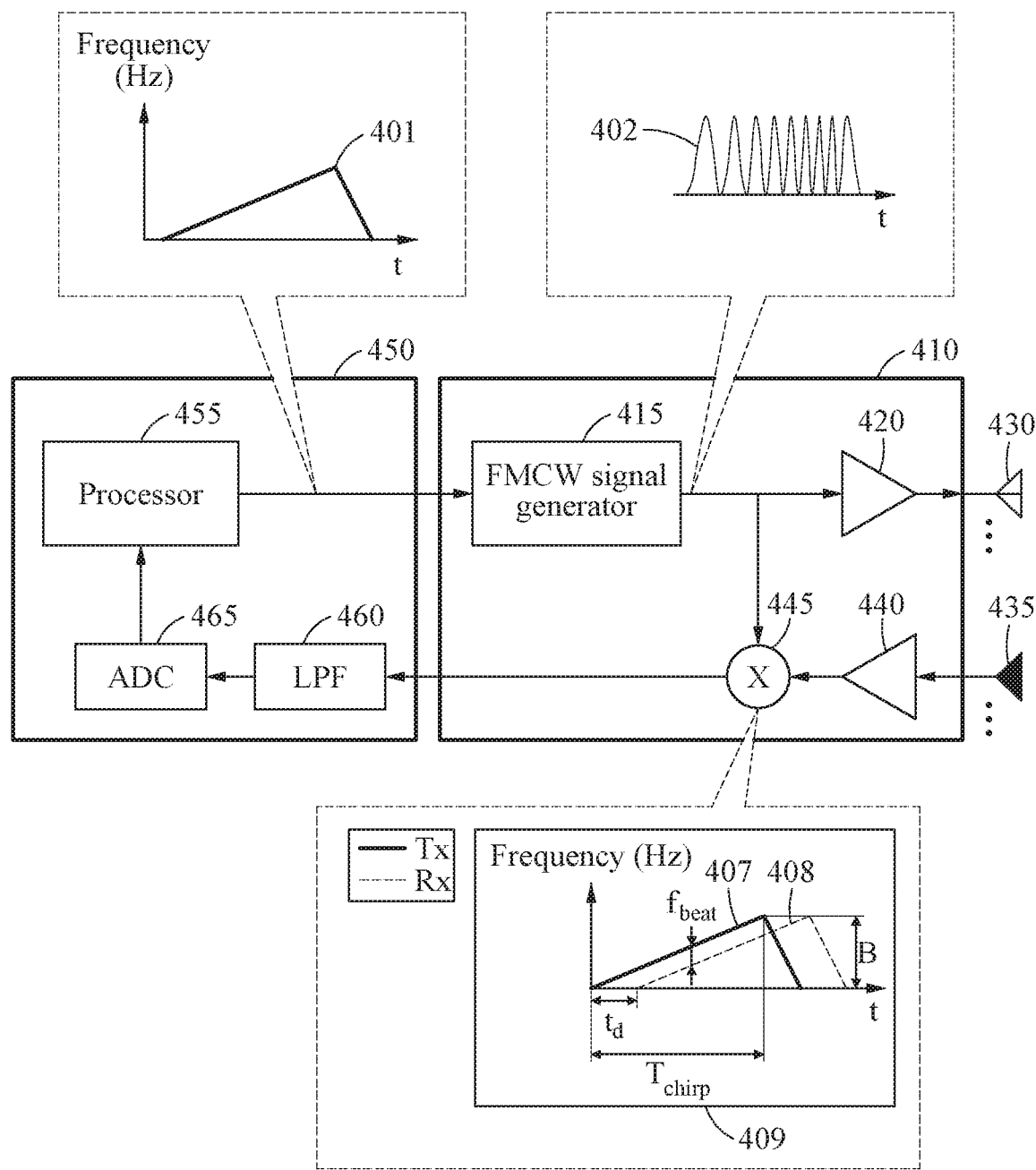
FIG. 4 is a diagram illustrating an example of a 3D position measuring apparatus.

FIG. 4 is a diagram illustrating an example of a 3D position measuring apparatus.

Referring to FIG. 4, a 3D position measuring apparatus includes, for example, a radar sensor 410 and a signal processor 450.

The radar sensor 410 may generate an FMCW signal based on a frequency modulation control signal transferred from the signal processor 450, and may transmit the generated FMCW signal as a transmission signal through a transmitting antenna 430. In addition, the radar sensor 410 may obtain, through a receiving antenna 435, a received signal resulting from the FMCW signal being reflected by an object, and being incident on the radar sensor 410. The transmitting antenna 430 may include a plurality of transmitting antennas, and the receiving antenna 435 may include a plurality of receiving antennas.

The radar sensor 410 may include an FMCW signal generator 415, a power amplifier 420, the transmitting antenna 430, the receiving antenna 435, a low-noise amplifier 440, and a frequency mixer 445.

The FMCW signal generator 415 may generate a FMCW signal 402 of which a carrier frequency varies over time based on setting information of a transmission signal. The setting information of the transmission signal may include setting information associated with settings of a detection area or a detection resolution. In an example, the FMCW signal generator 415 may include a voltage-controlled oscillator (VCO) circuit for generating various oscillation frequencies, and a phase-locked loop (PLL) circuit for improving stability of an output frequency of the VCO circuit.

The FMCW signal generator 415 may generate the FMCW signal 402 by modulating the carrier frequency based on a frequency modulation model 401 defined by a processor 455. The FMCW signal 402 may also be referred to as a chirp signal. The frequency modulation model 401 may be a model indicating a change in a carrier frequency of a transmission signal to be transmitted through the radar sensor 410. In the frequency modulation model 401, a vertical axis indicates a magnitude of the carrier frequency and a horizontal axis indicates a time. For example, the frequency modulation model 401 may have a pattern in which the carrier frequency changes linearly or nonlinearly over time.

In the example of FIG. 4, the frequency modulation model 401 may have a pattern such that a carrier frequency varies linearly over time. The FMCW signal generator 415 may generate the FMCW signal 402 having a pattern such that the carrier frequency changes based on the frequency modulation model 401. For example, as illustrated, the FMCW signal 402 may correspond to a waveform in which the carrier frequency gradually increases in some time intervals, and gradually decreases in other time intervals. In the graph illustrating the FMCW signal 402, a vertical axis indicates a magnitude of the FMCW signal 402, and a horizontal axis indicates a time.

The FMCW signal 402 generated by the FMCW signal generator 415 may be transferred to the power amplifier 420. The power amplifier 420 may amplify the received FMCW signal 402, and transfer the amplified FMCW signal to the transmitting antenna 430. The transmitting antenna 430 may radiate the amplified FMCW signal as the transmission signal.

The receiving antenna 435 may receive, as the received signal, a reflected signal obtained from the radiated transmission signal being reflected by an object and then returned. The low-noise amplifier 440 may amplify and output only a received signal component excluding noise from the received signal. The frequency mixer 445 may demodulate a previous signal, for example, the original chirp signal, which is one before the frequency modulation, from the received signal amplified by the low-noise amplifier 440. The frequency mixer 445 may then transfer the demodulated signal to the signal processor 450.

The signal processor 450 may process the received signal transferred from the radar sensor 410 and estimate 3D position information of the object. The signal processor 450 may include, for example, the processor 455, a low-pass filter (LPF) 460, and an analog-to-digital converter (ADC) 465.

The LPF 460 may filter a low-frequency band signal out of the received signal transferred from the radar sensor 410 to reduce noise of a high-frequency component that is included in the received signal. The ADC 465 may convert, to a digital signal, the received signal that is an analog signal obtained through such low-pass filtering. The processor 455 may output, to the FMCW signal generator 415, the frequency modulation control signal for generating the FMCW signal 402, and estimate the 3D position information of the object based on a received signal through a signal processing operation.

In the illustrated example, the processor 455 may compare a frequency 408 of the reflected signal (or indicated by Rx) and a frequency 407 of the transmission signal (or indicated by Tx). The processor 455 may detect a difference between the frequency 408 of the reflected signal and the frequency 407 of the transmission signal, and generate a beat frequency signal indicating the difference between the frequency 408 and the frequency 407. Such a frequency difference between the reflected signal and the transmission signal may indicate a difference $f_{beat}$ during a time interval in which the carrier frequency increases over time in the frequency modulation model 401 in a graph 409. The frequency difference $f_{beat}$ may be proportional to a distance between the radar sensor 410 and the object. Thus, the distance between the radar sensor 410 and the object may be derived from the frequency difference between the reflected signal and the transmission signal.

In an example, distance information with respect to a position of the object may be calculated as represented by Equation 7.

$$R = \frac{c \times T_{chirp} \times f_{beat}}{2 \times B} \quad \text{[Equation 7]}$$

In Equation 7, R is a distance, or a range, between the radar sensor 410 and the object, and c is a velocity of light. $T_{chirp}$ is a time length corresponding to an ascending interval in which the carrier frequency increases in the radiated transmission signal. B is a modulation frequency bandwidth. A beat frequency $f_{beat}$ is a frequency difference between the transmission signal and the reflected signal at a time point in the ascending interval. The beat frequency $f_{beat}$ may be derived as represented by Equation 8.

$$f_{beat} = \frac{t_d \times B}{T_{chirp}} \qquad \text{[Equation 8]}$$

In Equation 8, $f_{beat}$ is a beat frequency, and $t_d$ is a reciprocating delay time with respect to a position of the object, which corresponds to a time difference, or a delay time, between a time point at which the transmission signal is radiated (or transmitted) and a time point at which the reflected signal is received. In addition, B is a modulation frequency bandwidth.

Figure 5:
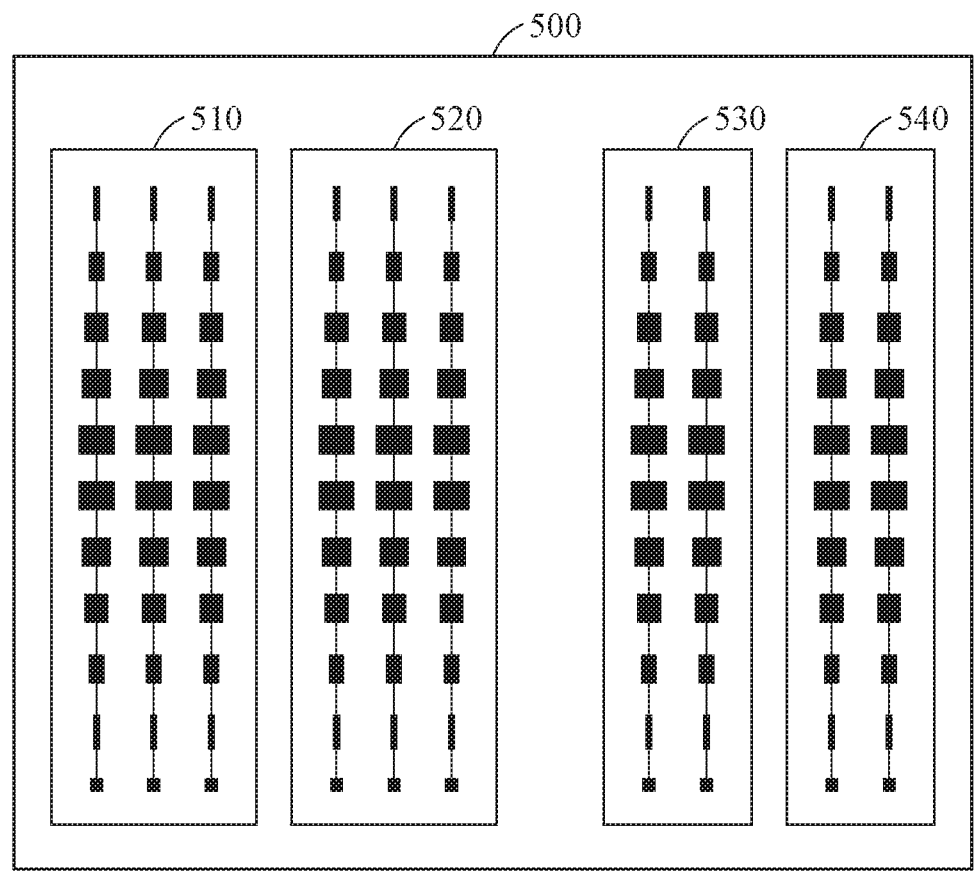
FIG. 5 is a diagram illustrating an example of an arrangement of antennas of a radar sensor.

FIG. 5 is a diagram illustrating an example of an arrangement of antennas of a radar sensor.

Referring to FIG. 5, an antenna array 500 of a radar sensor may include transmitting antennas 510 and 520, and receiving antennas 530 and 540. The transmitting antennas 510 and 520 form a plurality of transmission channels, and the receiving antennas 530 and 540 form a plurality of reception channels. In an example, the antenna array 500 may be provided in a form of series-fed patch, and the transmitting antennas 510 and 520 and the receiving antennas 530 and 540 may be arranged in a horizontal direction in the radar sensor, or arranged widthwise in the radar sensor. Based on a characteristic of such an arrangement of the transmitting antennas 510 and 520, there may be a characteristic indicating a change of a center direction of a transmission signal based on a change in a frequency band, which is described above with reference to FIG. 2. However, there may be no such change in a horizontal direction as the change of the center direction of the transmission signal based on the frequency band. In another example, the radar sensor may include an antenna that has a frequency scanning characteristic.

Figure 6:
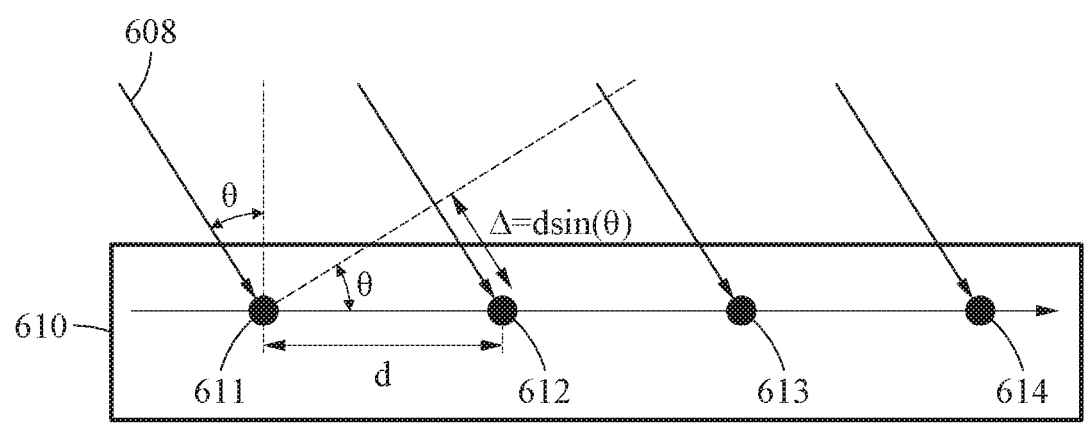
FIG. 6 is a diagram illustrating an example of a receiving antenna array of a radar sensor.

FIG. 6 is a diagram illustrating an example of a receiving antenna array of a radar sensor.

A 3D position measuring apparatus may estimate an azimuth with respect to a position of an object by analyzing reflected signals that are obtained through receiving antennas respectively forming a plurality of reception channels. Referring to FIG. 6, reflected signals that are received respectively through reception channels may have a phase difference from a reference phase. The reference phase may be an arbitrary phase or a phase of one of the reception channels.

The 3D position measuring apparatus may generate a radar vector of a dimension corresponding to the number of the reception channels based on the reflected signals received through the reception channels. For example, when a radar sensor has four reception channels, the 3D position measuring apparatus may generate a four-dimensional radar vector including a phase value corresponding to each of the reception channels. The phase value corresponding to each of the reception channels may be a numerical value indicating the phase difference described in the foregoing.

For another example, when the radar sensor includes one transmission channel and four reception channels, a transmission signal radiated through the transmission channel may be reflected from a position of an object, and the reflected signal may be received respectively through the four reception channels. For example, as illustrated, a receiving antenna array 610 includes a first receiving antenna 611, a second receiving antenna 612, a third receiving antenna 613, and a fourth receiving antenna 614. In the example of FIG. 6, a phase of a signal to be received by the first receiving antenna 611 is set to be a reference phase. In the example, when a reflected signal 608 that is reflected from a position of a same object is received by the receiving antenna array 610, an additional distance Δ of a distance from the position of the object to the second receiving antenna 612, compared to a distance from the position of the object to the first receiving antenna 611, may be represented by Equation 9.

$$\Delta = d \times \sin(\theta) \qquad \text{[Equation 9]}$$

In Equation 9, θ is an angle of arrival (AOA) at which the reflected signal 608 is received from the position of the object, and d is a distance between the receiving antennas. c is a velocity of light in the air which is taken as a constant. Here, c=fλ, and thus a phase change W in the second receiving antenna 612 due to the additional distance 4 may be represented by Equation 10.

$$W = \frac{2\pi}{\lambda} d \times \sin(\theta) \qquad \text{[Equation 10]}$$

The phase change W may correspond to a phase difference between a waveform of a reflected signal received by the first receiving antenna 611 and a waveform of a reflected signal received by the second receiving antenna 612. In Equation 10 above, a wavelength A may be inversely proportional to a frequency f of the reflected signal 608. For example, when a change in a carrier frequency by a frequency modulation model is small, the frequency f may be considered a single initial frequency, for example, $f_0$, in the frequency modulation model. Thus, when the phase change W is determined based on the received reflected signal 608, the 3D position measuring apparatus may determine the AOA θ and estimate the azimuth with respect to the position of the object based on the determined AOA θ.

Figure 7:
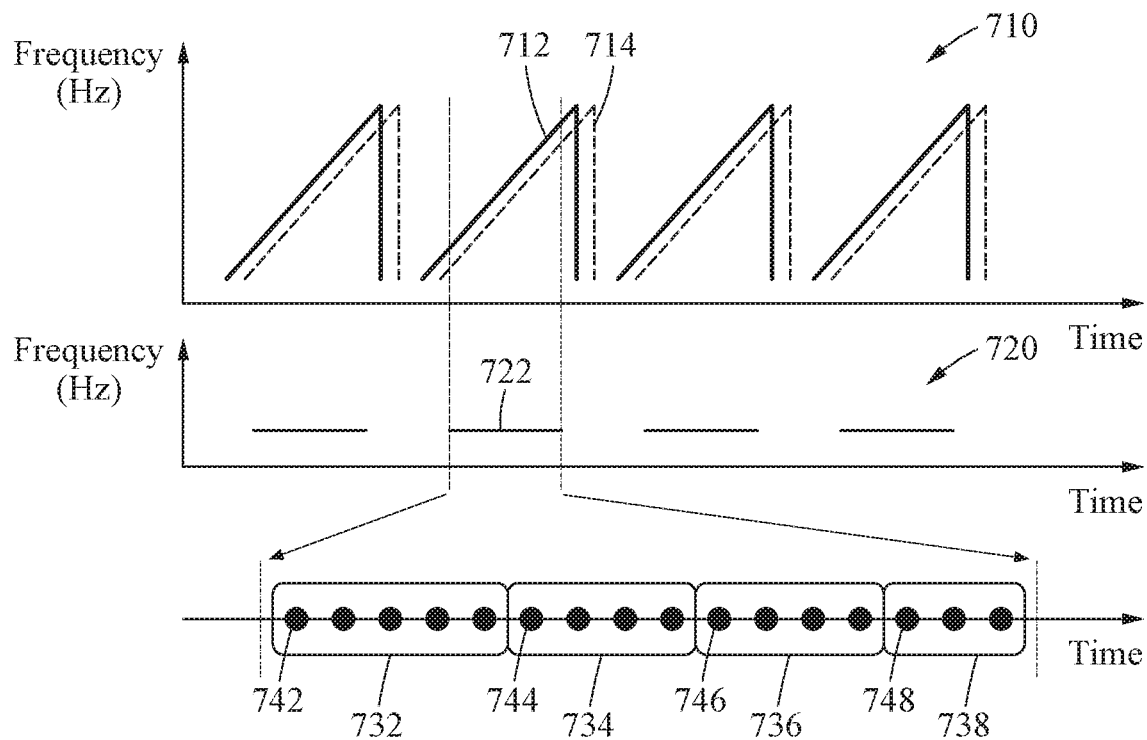
FIG. 7 is a diagram illustrating an example of estimating distance information and elevation angle information from a reflected signal.

FIG. 7 is a diagram illustrating an example of estimating distance information and elevation angle information from a reflected signal.

Referring to FIG. 7, in a first graph 710, a solid line indicates a rough waveform of a transmission signal 712 to be transmitted by a transmitting antenna, and a broken line indicates a rough waveform of a reflected signal 714 to be received by a receiving antenna.

In the example of FIG. 7, the transmission signal 712 having a pattern in which a carrier frequency increases linearly will be described for the convenience of description. For example, the carrier frequency may linearly increase by a frequency bandwidth BW from an initial frequency $f_c$ to a last frequency $f_c$+BW.

In the example, a distance to an object may be estimated based on a time difference between the transmission signal 712 and the reflected signal 714.

A 3D position measuring apparatus may calculate a beat frequency corresponding to a frequency difference between the transmission signal 712 and the reflected signal 714, and obtain a beat frequency signal indicating a change of the beat frequency over time. An example of the beat frequency signal is as illustrated in a second graph 720. The beat frequency may correspond to a reciprocating time or distance taken up to a time at which the transmission signal 712 is reflected by the object to be the reflected signal 714 and the reflected signal 714 is received. The beat frequency may be used to estimate distance information associated with the distance to the object. In the example, the 3D position measuring apparatus may obtain a beat frequency signal 722 corresponding to a chirp signal.

The 3D position measuring apparatus may sample the beat frequency signal 722 corresponding to the chirp signal (corresponding to one period). The 3D position measuring apparatus may then obtain groups of sample data by converting a signal value obtained by sampling the beat frequency signal 722 to a digital value. Here, a measurable beat frequency may be determined based on a sampling frequency that samples the beat frequency signal 722, and this may be associated with a detection area, which is a measurable distance.

In the example, all the groups of sample data that are sampled from the beat frequency signal 722 include a first sample data group 732, a second sample data group 734, a third sample data group 736, and a fourth sample data group 738 that respectively correspond to different frequency bands. The first sample data group 732 is a group of sample data 742 corresponding to a first frequency band, and the second sample group 734 is a group of sample data 744 corresponding to a second frequency band. In addition, the third sample data group 736 is a group of sample data 746 corresponding to a third frequency band, and the fourth sample data group 738 is a group of sample data 748 corresponding to a fourth frequency band. The first through fourth frequency bands may have scopes respectively corresponding to four frequency bands into which the frequency band from the initial frequency $f_c$ through the last frequency $f_c+BW$ that is described above is divided.

In this example, distance information with respect to a position of the object may be derived from a result of applying a time-frequency analysis method to each of the sample data groups 732, 734, 736, and 738. In addition, elevation angle information with respect to the position of the object may be derived from a result of separating each of the sample data groups 732, 734, 736, and 738 of the different frequency bands and applying the time-frequency analysis method to sample data included in each of the sample data groups 732, 734, 736, and 738. To estimate the elevation angle information, all or some of the sample data groups obtained by sampling the chirp signal may be used.

As described above, a transmission signal to be transmitted from transmitting antennas may be different in a center direction for each frequency band in a vertical direction in which the transmission signal proceeds. The 3D position measuring apparatus may separate the sample data groups 732, 734, 736, and 738 of different frequency bands using such a characteristic of the transmission signal, and perform the time-frequency analysis method such as a Fourier transform or a WF to estimate elevation information in the vertical direction. In an example, the 3D position measuring apparatus may simultaneously derive the distance information and the elevation angle information with respect to a position of the object through the time-frequency analysis method. The elevation angle information in the vertical direction may be estimated in a time domain, and the distance information may be estimated in a frequency domain.

Through such a processing method described above, the 3D position measuring apparatus may effectively estimate a position of an object in an elevation angle direction without using an antenna of different performance or without applying a complex antenna arrangement. Thus, it is possible to measure a 3D position of the object only with relatively less complex control and a simple antenna arrangement, and to reduce a cost used for measuring the 3D position.

In an example, the 3D position measuring apparatus may estimate an azimuth with respect to a position of the object through DBF. For example, the 3D position measuring apparatus may calculate a difference occurring among reflected signals received respectively by receiving antennas, and estimate a direction in which a reflected signal is received based on the calculated difference. The 3D position measuring apparatus may estimate the azimuth of the object based on the estimated direction.

Figure 8:
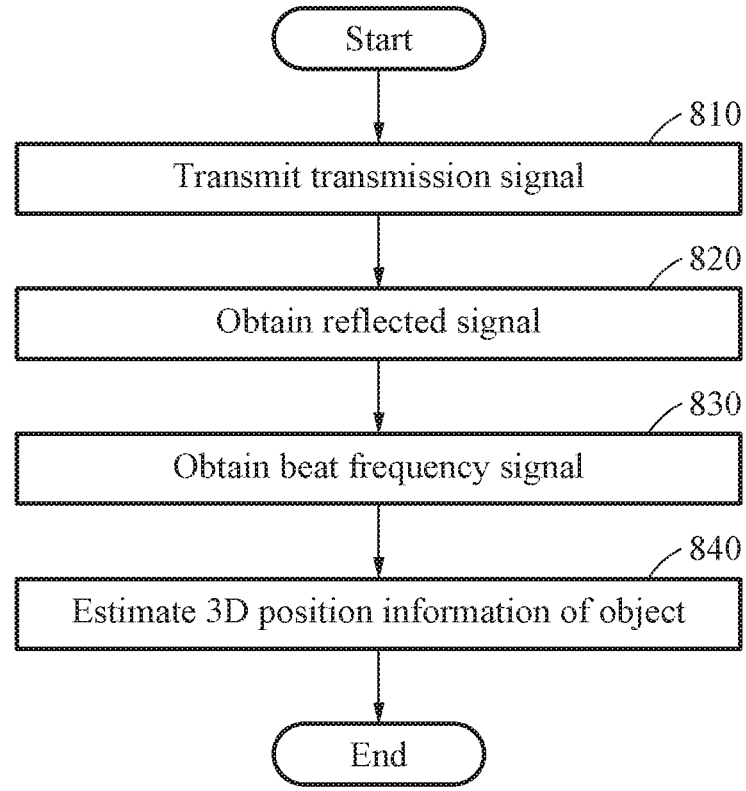
FIGS. 8 and 9 are flowcharts illustrating an example of a 3D position measuring method using a radar sensor.
Figure 9:
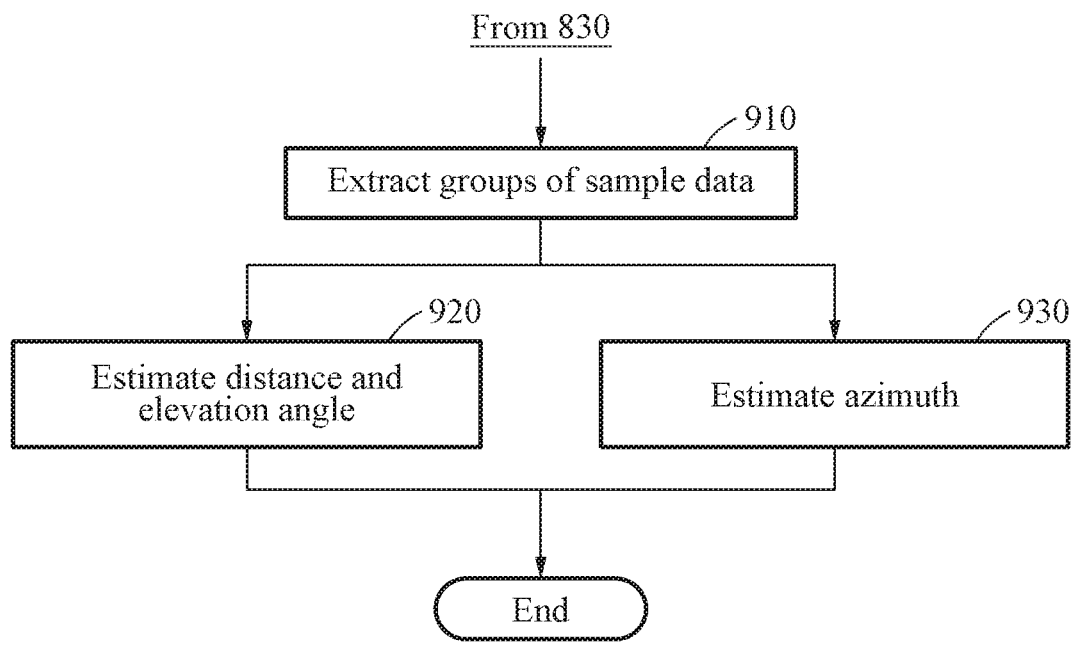

FIGS. 8 and 9 are flowcharts illustrating an example of a 3D position measuring method using a radar sensor.

Referring to FIG. 8, in operation 810, a 3D position measuring apparatus transmits, through a radar sensor, a transmission signal of which a carrier frequency varies over time. For example, the 3D position measuring apparatus may generate a FMCW signal by modulating a carrier frequency based on a frequency modulation model that uses a linear frequency modulation method, and may radiate the generated FMCW signal through one or more transmitting antennas of the radar sensor. In operation 820, the 3D position measuring apparatus obtains, through the radar sensor, a reflected signal from the transmission signal being reflected by an object. For example, the 3D position measuring apparatus may receive the reflected signal through one or more receiving antennas of the radar sensor.

In operation 830, the 3D position measuring apparatus obtains a beat frequency signal indicating a frequency difference between the transmission signal and the reflected signal. For example, the 3D position measuring apparatus may calculate a beat frequency signal for each of reception channels respectively corresponding to the receiving antennas. In operation 840, the 3D position measuring apparatus estimates 3D position information of the object based on the beat frequency signal. For example, the 3D position measuring apparatus may estimate the 3D position information of the object based on groups of sample data of different frequency bands that are extracted from the beat frequency signal. Hereinafter, operation 840 will be described in greater detail with reference to FIG. 9.

Referring to FIG. 9, in operation 910, the 3D position measuring apparatus extracts groups of sample data from the beat frequency signal. For example, the 3D position measuring apparatus may extract the groups of sample data by sampling the beat frequency signal at sampling points, and converting signal values of sampled beat frequency signals to corresponding digital signal values. The 3D position measuring apparatus may extract groups of sample data from a beat frequency signal corresponding to a chirp signal.

In operation 920, the 3D position measuring apparatus estimates a distance and an elevation angle with respect to a position of the object based on groups of sample data of different frequency bands that are included in the extracted groups of sample data. For example, the 3D position measuring apparatus may estimate the elevation angle with respect to the position of the object using a change of a center direction of the transmission signal for each frequency band of the transmitting antennas included in the radar sensor. For example, the 3D position measuring apparatus may estimate the distance and the elevation angle with respect to the position of the object by applying a time-frequency analysis method to the groups of sample data of the different frequency bands. The time-frequency analysis method may include an STFT and a WT, for example. The 3D position measuring apparatus may calculate the distance and the elevation angle simultaneously through the time-frequency analysis method. For a more detailed description of operation 920 of estimating the distance and/or the elevation angle, reference may be made to the description above with reference to FIGS. 4 and 7.

In operation 930, the 3D position measuring apparatus estimates an azimuth with respect to the position of the object based on beat frequency signals respectively corresponding to the receiving antennas of the radar sensor. The 3D position measuring apparatus may estimate the azimuth with respect to the position of the object using a DBF method, a MUSIC method, an ESPRIT, a MVDR method, or a Bartlett's method, for example. For example, the 3D position measuring apparatus may estimate the azimuth through the DBF method that estimates a direction in which a reflected signal is received based on a difference occurring among the beat frequency signals. For a more detailed description of operation 930 of estimating the azimuth, reference may be made to what has been described above with reference to FIGS. 3 and 6.

Figure 10:
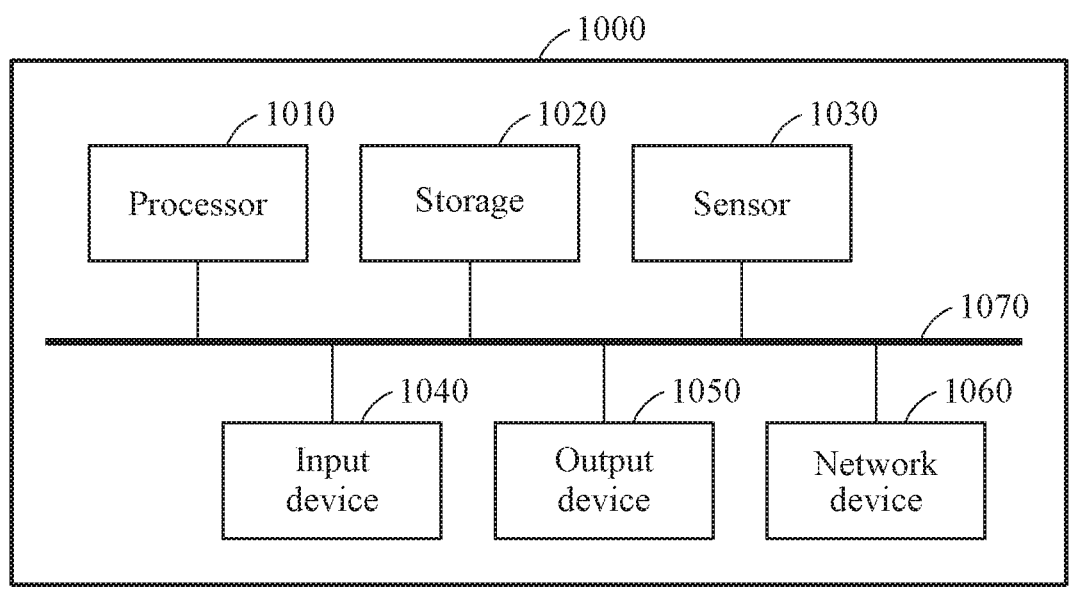
FIG. 10 is a diagram illustrating an example of a computing apparatus.

FIG. 10 is a diagram illustrating an example of a computing apparatus 1000.

Referring to FIG. 10, the computing apparatus 1000 may be an apparatus that may perform a function of measuring a 3D position of an object as described above. In an example, the computing apparatus 1000 may perform the operations and functions of the 3D position measuring apparatus 300 described above with reference to FIG. 3. The computing apparatus 1000 may be used for automated or autonomous driving, driver assistance, facial recognition, gesture recognition, surveillance/security systems, and the like. The computing apparatus 1000 may operate as described above by being provided in an image processing apparatus, a smartphone, a wearable device, a tablet computer, a netbook, a laptop, a desktop, a head-mounted display (HMD), a self-driving vehicle, or a smart vehicle, for example.

Referring to FIG. 10, the computing apparatus 1000 includes, for example, a processor 1010, a storage 1020, a sensor 1030, an input device 1040, an output device 1050, and a network device 1060. The processor 1010, the storage 1020, the sensor 1030, the input device 1040, the output device 1050, and the network device 1060 may communicate with one another through a communication bus 1070.

The processor 1010 may execute functions and instructions in the computing apparatus 1000. For example, the processor 1010 may process instructions stored in the storage 1020. The processor 1010 may perform one or more, or all, of operations described above with reference to FIGS. 1a through 9.

The storage 1020 may store information or data to be processed by the processor 1010. The storage 1020 may store instructions to be executed by the processor 1010. The storage 1020 may include a non-transitory computer-readable storage medium, for example, a random-access memory (RAM), a dynamic RAM (DRAM), a static RAM (SRAM), a magnetic hard disk, an optical disc, a flash memory, an electrically erasable programmable read-only memory (EPROM), a floppy disk, or other types of a computer-readable storage medium that are well-known in the related technical field.

The sensor 1030 may include one or more sensors, for example, a radar sensor, an image sensor, and/or the like.

The input device 1040 may receive an input from a user through a tactile input, a video input, an audio input, or a touch input. The input device 1040 may include, for example, a keyboard, a mouse, a touchscreen, a microphone, and/or other devices that may detect the input from the user and transmit the detected input.

The output device 1050 may provide an output of the computing apparatus 1000 to a user through a visual, auditory, or tactile channel. The output device 1050 may include, for example, a liquid crystal display (LCD), a light-emitting diode (LED) display, a touchscreen, a speaker, a vibration generator, and/or other devices that may provide the user with the output. In an example, the output device 1050 may provide a result of estimating 3D position information of an object by the processor 1010 using any one or any combination of any two or more of visual information, auditory information, or haptic information.

The network device 1060 may communicate with an external device through a wired or wireless network. For example, the network device 1060 may communicate with the external device through a wired communication method, or a wireless communication method including, for example, Bluetooth, WiFi, third-generation (3G) communication, long-term evolution (LTE) communication, or the like.

The processors 320, 455, and 1010, the FMCW signal generator 415, the storage 1020, the communication bus 1070, the processors, the memories, and other components and devices in FIGS. 1a to 10 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1a to 10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method with three-dimensional (3D) position measuring using a radio detection and ranging (radar) sensor, comprising:
    transmitting, through the radar sensor, a transmission signal of which a carrier frequency varies over time, using a plurality of transmitting antennas included in the radar sensor;
    obtaining, through the radar sensor, a reflected signal from the transmission signal being reflected by an object;
    obtaining beat frequency signals respectively corresponding to receiving antennas of the radar sensor and indicating a frequency difference between the transmission signal and the reflected signal;
    estimating 3D position information of the object based on groups of sample data of different frequency bands extracted from the beat frequency signals; and
    changing at least one of a detection area and a detection resolution based on a result of the estimating of the 3D position information,
    wherein the estimating of the 3D position information of the object comprises:
        estimating an elevation angle with respect to a position of the object using a change of a center direction of the transmission signal for each frequency band among frequency bands of the transmitting antennas, and
        estimating an azimuth with respect to a position of the object based on the beat frequency signals respectively corresponding to the receiving antennas of the radar sensor.

2. The method of claim 1, wherein the estimating of the 3D position information of the object comprises:
    extracting a plurality of groups of sample data from the beat frequency signals corresponding to a chirp signal, the plurality of groups of sample data including the groups of sample data of the different frequency bands; and estimating a distance and an elevation angle with respect to the position of the object based on the groups of sample data of the different frequency bands.

3. The method of claim 2, wherein the estimating of the distance and the elevation angle comprises:
estimating the distance and the elevation angle with respect to the position of the object by applying a time-frequency analysis method to the groups of sample data of the different frequency bands.

4. The method of claim 3, wherein the estimating of the distance and the elevation angle comprises:
calculating the distance and the elevation angle simultaneously through the time-frequency analysis method.

5. The method of claim 3, wherein the time-frequency analysis method is a short-time Fourier transform (STFT) or a wavelet transform (WT).

6. The method of claim 1, wherein the transmitting antennas are arranged in a horizontal direction in the radar sensor.

7. The method of claim 1, wherein the 3D position information comprises a distance, the azimuth, and the elevation angle with respect to the position of the object.

8. The method of claim 7, wherein the estimating of the 3D position information of the object comprises:
estimating the azimuth through digital beamforming for estimating a direction in which the reflected signal is received based on a difference occurring among the beat frequency signals.

9. The method of claim 1, wherein the carrier frequency is modulated based on a frequency modulation model that uses linear frequency modulation.

10. A non-transitory computer-readable storage medium storing instructions that, when executed by a processor, cause the processor to perform the method of claim 1.

11. An apparatus with three-dimensional (3D) position measuring, comprising:
a radio detection and ranging (radar) sensor configured to transmit a transmission signal of which a carrier frequency varies over time, using a plurality of transmitting antennas included in the radar sensor, and obtain a reflected signal from the transmission signal being reflected by an object; and
a processor configured to:
obtain beat frequency signals respectively corresponding to receiving antennas of the radar sensor and indicating a frequency difference between the transmission signal and the reflected signal;
estimate 3D position information of the object based on groups of sample data of different frequency bands extracted from the beat frequency signals; and
change at least one of a detection area and a detection resolution based on a result of the estimating of the 3D position information;
wherein the estimating of the 3D position information of the object comprises:
estimating an elevation angle with respect to a position of the object using a change of a center direction of the transmission signal for each frequency band among frequency bands of the transmitting antennas, and
estimating an azimuth with respect to a position of the object based on the beat frequency signals respectively corresponding to the receiving antennas of the radar sensor.

12. The apparatus of claim 11, wherein the processor is further configured to:
extract a plurality of groups of sample data from the beat frequency signals corresponding to a chirp signal, the plurality of groups of sample data including the groups of sample data of the different frequency bands; and
estimate a distance and an elevation angle with respect to the position of the object based on the groups of sample data of the different frequency bands.

13. The apparatus of claim 12, wherein the processor is further configured to:
estimate the distance and the elevation angle with respect to the position of the object by applying a time-frequency analysis method to the groups of sample data of the different frequency bands.

14. The apparatus of claim 13, wherein the time-frequency analysis method is a short-time Fourier transform (STFT) or a wavelet transform (WT).

15. The apparatus of claim 11, wherein the processor is further configured to:
estimate the azimuth through digital beamforming for estimating a direction in which the reflected signal is received based on a difference occurring among the beat frequency signals.

16. An apparatus with three-dimensional (3D) position measuring, comprising:
a radio detection and ranging (radar) sensor configured to:
transmit a transmission signal of which a carrier frequency varies over time, using a plurality of transmission antennas included in the radar sensor corresponding to respective frequency bands of the transmission signal; and
obtain a reflected signal from the transmission signal being reflected by an object; and
a processor configured to:
obtain beat frequency signals respectively corresponding to receiving antennas of the radar sensor and indicating a frequency difference between the transmission signal and the reflected signal;
estimate 3D position information of the object based on groups of sample data of different frequency bands extracted from the beat frequency signals; and
change at least one of a detection area and a detection resolution based on a result of the estimating of the 3D position information,
wherein the estimating of the 3D position information of the object comprises:
estimating an elevation angle with respect to a position of the object based on a change of a center direction of the transmission signal for each frequency band among frequency bands of the transmitting antennas, and
estimating an azimuth with respect to a position of the object based on the beat frequency signals respectively corresponding to the receiving antennas of the radar sensor.

17. The apparatus of claim 16, wherein the 3D position information includes a distance and an elevation of a position of the object relative to a position of the apparatus.

18. The apparatus of claim 16, wherein the processor is further configured to estimate the 3D position information by estimating a distance and an elevation angle with respect to a position of the object by applying a time-frequency analysis method to the groups of sample data of the different frequency bands.

* * * * *